US010631225B2

(12) United States Patent
Chaki et al.

(10) Patent No.: US 10,631,225 B2
(45) Date of Patent: Apr. 21, 2020

(54) DEVICE WITHIN A WIRELESS PEER-TO-PEER NETWORK, WIRELESS COMMUNICATION SYSTEM AND CONTROL METHOD

(71) Applicant: NEC CORPORATION, Tokyo (JP)

(72) Inventors: Prakash Chaki, Tokyo (JP); Masato Yasuda, Tokyo (JP); Kazuaki Nakajima, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/741,406

(22) PCT Filed: Jul. 3, 2015

(86) PCT No.: PCT/JP2015/003369
§ 371 (c)(1),
(2) Date: Jan. 2, 2018

(87) PCT Pub. No.: WO2017/006361
PCT Pub. Date: Jan. 12, 2017

(65) Prior Publication Data
US 2018/0376400 A1  Dec. 27, 2018

(51) Int. Cl.
*H04W 40/02* (2009.01)
*H04W 76/19* (2018.01)
(Continued)

(52) U.S. Cl.
CPC .......... *H04W 40/02* (2013.01); *H04L 67/104* (2013.01); *H04L 67/1042* (2013.01);
(Continued)

(58) Field of Classification Search
CPC . H04L 41/0213; H04L 45/121; H04L 45/123; H04L 47/10; H04L 47/14;
(Continued)

(56) References Cited

U.S. PATENT DOCUMENTS

2005/0041591 A1* 2/2005 Duggi .................. H04L 45/123
370/252
2008/0159142 A1* 7/2008 Nagarajan ............ H04L 45/121
370/235
(Continued)

FOREIGN PATENT DOCUMENTS

EP  2 634 999 A1  9/2013
EP  2 701 447 A1  2/2014
(Continued)

OTHER PUBLICATIONS

Communication dated Jan. 15, 2019 issued by the Japanese Patent Office in counterpart application No. 2018-517920.
(Continued)

*Primary Examiner* — Harun Chowdhury
(74) *Attorney, Agent, or Firm* — Sughrue Mion, PLLC

(57) ABSTRACT

A device includes an upper layer that performs routing at least one packet and a Peer to Peer (P2P) unit that provides information about formation of a wireless P2P network to the upper layer which is higher than a data link layer.

19 Claims, 11 Drawing Sheets

(51) Int. Cl.
*H04L 29/08* (2006.01)
*H04W 40/24* (2009.01)
*H04W 40/36* (2009.01)

(52) U.S. Cl.
CPC ......... *H04L 67/1061* (2013.01); *H04W 40/24* (2013.01); *H04W 40/36* (2013.01); *H04W 76/19* (2018.02)

(58) Field of Classification Search
CPC ............... H04L 67/104; H04L 67/1042; H04L 67/1061; H04W 4/12; H04W 40/02; H04W 40/30; H04W 40/24; H04W 40/36; H04W 76/19
USPC .................. 370/230, 235, 252, 255
See application file for complete search history.

(56) References Cited

U.S. PATENT DOCUMENTS

| | | | |
|---|---|---|---|
| 2011/0141888 A1* | 6/2011 | Leguay | H04L 47/10 370/230 |
| 2011/0235550 A1* | 9/2011 | Adams | H04W 40/30 370/255 |
| 2011/0310733 A1 | 12/2011 | Tzamaloukas et al. | |
| 2012/0155643 A1 | 6/2012 | Hassan et al. | |
| 2013/0067065 A1 | 3/2013 | Navasivasakthivelsamy et al. | |
| 2013/0067068 A1 | 3/2013 | Hassan et al. | |
| 2013/0204962 A1 | 8/2013 | Estevez et al. | |
| 2013/0232253 A1 | 9/2013 | Elhaddad et al. | |
| 2014/0003286 A1 | 1/2014 | Estevez et al. | |
| 2014/0056209 A1 | 2/2014 | Park et al. | |
| 2015/0036483 A1 | 2/2015 | Hassan | |
| 2015/0043484 A1 | 2/2015 | Jung et al. | |
| 2015/0264123 A1* | 9/2015 | Smadi | H04W 4/12 709/206 |

FOREIGN PATENT DOCUMENTS

| | | |
|---|---|---|
| EP | 2 835 992 A2 | 2/2015 |
| WO | 2013/127015 A1 | 9/2013 |

OTHER PUBLICATIONS

Communication dated Oct. 30, 2018 issued by the Japanese Patent Office in counterpart application No. 2018-517920.
Decision to Grant a Patent dated May 14, 2019 issued by the Japanese Patent Office in counterpart application No. 2018-517920.
Wi-Fi Peer-to-Peer (P2P) Technical Specification Version 1.4; pp. 1-183.
International Search Report for PCT/JP2015/003369 dated Mar. 9, 2016.

\* cited by examiner

FIG. 3

SWITCHING SCHEDULE 203

| GROUP ID | | | |
|---|---|---|---|
| SWITCHING NODE ID | DESTINATION GROUP ID | DEPARTURE TIME | ARRIVAL TIME |
| NODE ID1 | GROUP ID1 | T1 | T3 |
| NODE ID2 | GROUP ID2 | T2 | T4 |
| ........ | ........ | ........ | ........ |

DEVICE WITHIN A WIRELESS PEER-TO-PEER NETWORK, WIRELESS COMMUNICATION SYSTEM AND CONTROL METHOD

CROSS REFERENCE TO RELATED APPLICATIONS

This application is a National Stage of International Application No. PCT/JP2015/003369 filed Jul. 3, 2015, the contents of all of which are incorporated herein by reference in their entirety.

TECHNICAL FIELD

The application relates to wireless communication systems. Particularly, this application relates to a packet routing mechanism.

BACKGROUND ART

Wi-Fi Peer-to-Peer (P2P), also known as Wi-Fi Direct, is a recently released specification for device-to-device communication. In the rest of the text, Wi-Fi P2P and Wi-Fi Direct have been used synonymously and interchangeably. The standard builds on the foundation of its predecessor Wi-Fi which is based on the Institute of Electrical and Electronics Engineers (IEEE) 802.11 standard, but strikingly differs from it in terms of the need of an Access Point (AP). Bringing down the AP functionality to software, the standard not only does away with the requirement of a specialized hardware for playing the role of AP, but also offers a fast and secure mode of ad-hoc communication. Thus, several Wi-Fi P2P capable devices can form a group and exchange information among each other without requiring any AP or Internet connection.

According to the Wi-Fi Peer-To-Peer (P2P) Technical specification Version 1.4 (NPL 1), Wi-Fi P2P requires one of the devices to act as Group Owner (GO) whose role is analogous to AP in Wi-Fi Infrastructure mode. Any Wi-Fi P2P device is capable of playing the role of GO. Wi-Fi P2P devices interested in sharing information with each other initially engage in a comprehensive process of group formation by which one device is selected as GO. All devices stay associated to the GO and communication can only be performed inside the group.

CITATION LIST

Non Patent Literature

[NPL 1]
Wi-Fi Peer-To-Peer (P2P) Technical specification Version 1.4

SUMMARY OF INVENTION

Technical Problem

Wi-Fi Direct operates in a star topology where one node assumes the role of leader (called Group Owner or P2P GO in Wi-Fi P2P terminology) and some other nodes can associate to the GO as P2P Clients. Data communication is defined only within the members of a P2P group as communication outside group is not specified using a single physical/logical Medium Access Control (MAC) interface. Thus, efficient inter-group communication in a multi-group environment is a technical challenge. An object of certain exemplary embodiments is to solve foregoing problem and to provide a mechanism by which communication among multiple groups will be possible in an efficient manner.

In addition to the objects mentioned, other obvious and apparent advantages of the invention will be reflected from the detailed specification and drawings.

Solution to Problem

A device according to the exemplary embodiment comprises an upper layer that performs routing at least one packet and a Peer to Peer (P2P) unit that provides information about formation of a wireless P2P network to the upper layer which is higher than a data link layer.

A system according to the exemplary embodiment comprises a device and a destination device. The device includes an upper layer that performs routing at least one packet and a Peer to Peer (P2P) unit that provides information about formation of the P2P group to the upper layer which is higher than a data link layer. The destination device includes a receiver which receives the packet routed by the upper layer of the device.

A control method according to the exemplary embodiment comprises performing, at an upper layer, routing at least one packet and providing the information about formation of the wireless P2P network to the upper layer which is higher than a data link layer.

Advantageous Effects of Invention

According to the exemplary embodiments, communication among multiple P2P groups will be possible in an efficient manner.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF DRAWINGS

FIG. 3 is a schematic diagram showing an example of a switching schedule of a given Wi-Fi P2P group designed by the Group Owner and shared with all client nodes according to an exemplary embodiment.

DESCRIPTION OF EMBODIMENTS

Figure 1:
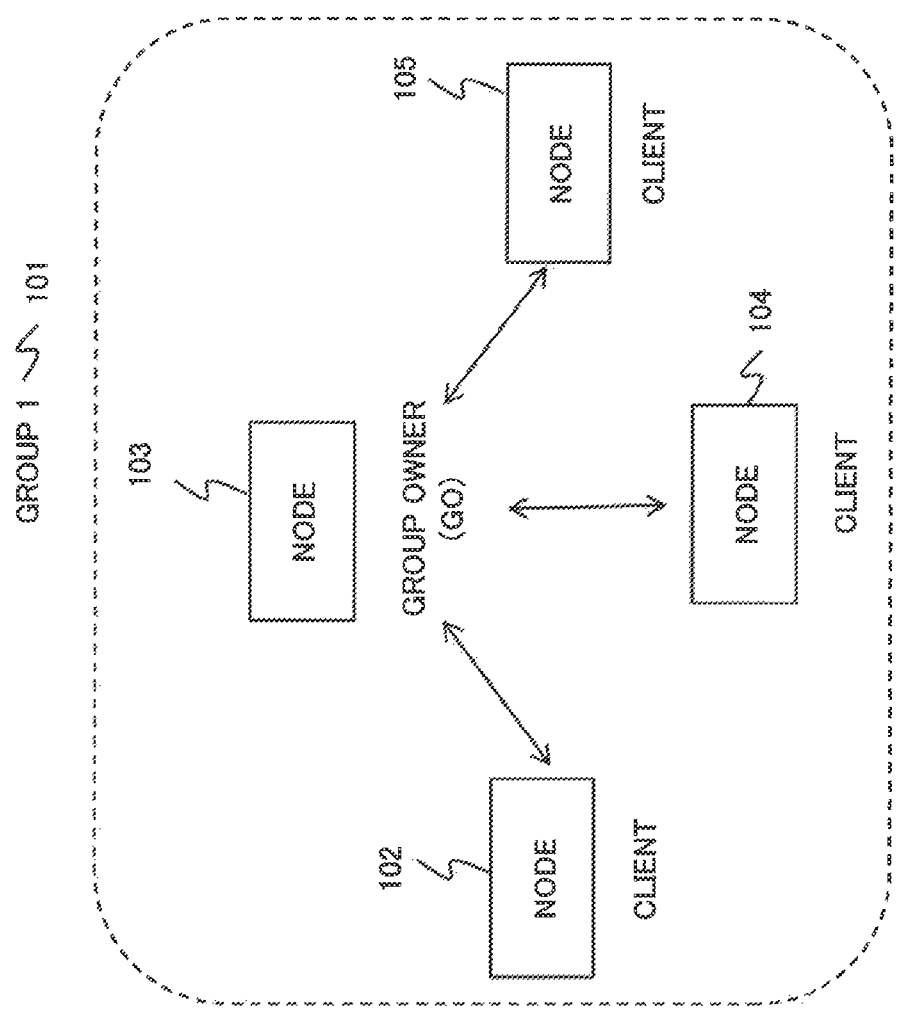
FIG. 1 is a schematic diagram showing an exemplary wireless Peer-to-Peer (P2P) group according to an exemplary embodiment.

Hereinafter, the word "exemplary" is used herein to mean "serving as an example, instance, or illustration". Any embodiment described herein as "exemplary" is not necessarily to be construed as preferred or advantageous over other embodiments.

1. Outline of Exemplary Embodiments

The lack of coordination between an upper layer (for example, layer responsible for packet routing) and a P2P communication link layer (for example, Wi-Fi P2P in data link layer) or an application managing P2P link establishment process may be a bottleneck in performance. However, for example, information flow from Wi-Fi Direct layer (or Wi-Fi Direct connection management application) to the upper layer can facilitate in devising a specialized routing protocol at higher layer which will use the information of inter-group switching events taking place in Wi-Fi P2P in data link layer. Such switching event may imply node from a first Wi-Fi P2P group disconnecting from the GO of the first P2P group and connecting to the GO of a second P2P group to share information between the first P2P group and the second P2P group. If such information about dynamic change in topology between multiple Wi-Fi P2P groups is shared with a upper layer, then efficient packet routing can be designed by the upper layer. Such method can be useful of routing packet from one group to another group. For example, Delay Tolerant Networks largely operates on opportunistic and intermittent connections available at any given time with zero-knowledge or predictions based on history. The present disclosure proposes a routing mechanism at upper layer (for example, Network layer or DTN layer or application layer) based on topology reformation information received from the Wi-Fi P2P stack operating in data link layer (or an application managing P2P link establishment).

Delay Tolerant Networking (DTN) is a networking technology that is used for communication between nodes that may lack continuous connectivity. In such applications, if there is absence of an instantaneous end-to-end routing path, data may be delivered from source to destination in a store-carry-forward mechanism. In this mechanism, no instantaneous end-to-end path is needed, rather data may be forwarded one hop at a time. Thus, intermediate nodes may store the data and wait for connection establishment with the next node in the route. In DTN, contiguous blocks of data are referred to as "bundle". Also called by the name "Bundle Protocol", the protocol may function as an overlay network over Transport Layer and Network layer. Bundles may be created from application data and sent from one node to another using aforementioned store-carry-forward method. In the present disclosure, the term DTN may be construed as Bundle Protocol. The term DTN may also be construed as a P2P content sharing application based on DTN.

In peer to peer content sharing or file sharing systems (for example, using DTN application), a message including information (for example, list of contents available at that node, or the contents itself) may be periodically generated by the application. Such information may be generated for sharing with a peer node. However, the upper layer generating the information may be unaware whether P2P wireless communication link (for example, Wi-Fi Direct) has been established with the destination peer node at data link layer. Due to absence of cross-layer coordination between upper layer and P2P wireless communication protocol operating at data link layer (or an application managing P2P link establishment), the information may be generated independently irrespective of the actual time instant when P2P connection establishment takes place in data link layer. An increase in the frequency of generation of the information can lead to unnecessary CPU occupancy and power wastage which is a critical issue in battery-powered low processor-configuration devices. On the other hand, a reduction of the frequency may cause unnecessary delay in communication even when P2P connection has been established in data link layer. Thus, a mechanism for information flow across the layers can help in deciding the exact time of generation of the information instead of doing it blindly.

Since Wi-Fi P2P operates in a group-based mechanism which restricts communication outside group, dynamic topology reformation may be an essential requirement for content distribution or data flow in a large ad-hoc gathering of nodes. In a system employing group reformation mechanism in Wi-Fi P2P, groups may be reformed over time by allowing nodes from one group to leave and join other groups once or more in an iterative fashion to share information from a first P2P group to a second P2P group. In such scenario, routing of data packets from one group to another group (direct or relayed over multiple groups) is an important problem. Since such topology reformation may be managed by an application managing P2P link establishment, the route management layer may not find the best end-to-end route for delivering a packet to a destination node associated to a different group without a coordination method between the application managing P2P link establishment and the routing layer. This is because, topology of such multi-group P2P network may change dynamically with time. Without any specialized routing protocol tailormade for dynamic topology reformations by taking into account the switching schedules of nodes shared from a P2P connection management application, the routing layer of sender node may be unaware of the best route from its group to another node in a different P2P group as there may be no permanent connection between the groups and inter-group topology varies dynamically with time. Inter-group communication may be facilitated by dynamic switching of nodes between a first P2P group and a second P2P group which may be done following a pre-decided schedule. Number of switching nodes and the number of times each of them switch between a first pair of P2P group may be different from that between a second pair of P2P groups. Thus, end-to-end message delivery time or other communication metric may differ between multiple routes. Thus, a specialized routing protocol for message delivery between multiple groups will require group reformation information (for example, switching schedule).

In an integrated system that may employ a peer to peer content or file sharing application (for example, DTN application based on intermittent connection establishment between peer nodes) in the upper layer and a P2P communication protocol (for example, Wi-Fi Direct) at data link layer, lack of coordination between the two layers may cause a bottleneck in performance. For example, such coordination may imply passing link establishment information from data link layer which is administered by Wi-Fi P2P protocol stack to the upper layer such that those information can be efficiently used in the upper layer while generating a message (for example, list of contents available at that node or the contents itself) to be shared with the peer node. Without such coordination, the message generation may be done blindly without prior knowledge of peer to peer link establishment at the data link layer. If the message is blindly generated after every "t" time units without any prior knowledge of P2P connection establishment from P2P communication protocol stack (or an application managing P2P communication link establishment), then in worst case scenario there can be a delay of "t" time units between P2P connection establishment and actual message transmission. This problem can delay the communication process by "t" units even if P2P connection is established at the data link layer, thus leading to performance degradation. Conversely, if the frequency of the message generation is blindly increased, it will lead to unnecessary CPU occupancy and power wastage which is a critical issue for battery-powered mobile devices with limited processing power.

Exemplary embodiments provide a routing mechanism based on group formation information which is shared by a coordination method between the P2P communication protocol stack (or an application managing P2P communication link establishment) and an upper layer (for example, a layer which manages routing) so as to enable efficient delivery of data between a first P2P group and a second P2P group. In the exemplary embodiments, the exact timing of a message (for example, list of contents available at that node or the contents itself, to be shared with a peer node) generation by a peer to peer content or file sharing application (for example, DTN application based on intermittent connection establishment between peer nodes) can be decided using the connection information from Wi-Fi Direct protocol stack operating at the data link layer.

An exemplary embodiment provides a connection method in wireless peer-to-peer group of nodes wherein one of the nodes act as leader and others act as client to the P2P group. One or more node(s) from each such P2P group may switch between two or more different P2P groups by disconnecting from present P2P group, connecting to another P2P group(s) and reconnecting back to its original P2P group following a group formation information. In the method, a P2P connection management application may send a P2P group formation information (s) of the P2P group itself as well as other neighboring P2P groups that may have been collected via switching nodes, to an upper layer where it can be used to compute optimum end-to-end route for packet delivery to a destination node that is associated to a different P2P group.

An exemplary embodiment provides a system in which one or more client nodes may be connected to a leader node to form a P2P group. One or more node(s) from each such P2P group may switch between two or more P2P groups by disconnecting from present P2P group, connecting to another P2P group(s) and reconnecting back to its original P2P group following a group formation information. The system may include a P2P connection management application sending a group formation information(s) of the P2P group itself as well as other neighboring P2P groups that may have been collected via switching nodes to an upper layer. The upper layer may compute a routing table based on routing metrics of all reachable routes to the destination extracted from the information provided by the P2P connection management application. Every P2P group may maintain its own group formation information (for example, switching schedule) which may be shared with other P2P groups. Having known each other's schedule, every P2P group can prepare a group formation table (for example, dynamic topology map or topology reformation schedule) which can be used in route computation for data delivery to a node in a different P2P group. A topology map may contain information of the topology of a wireless P2P group and its neighboring wireless P2P groups. If a switching-based communication opportunity (e.g., routing path) exists between a first wireless P2P group and second wireless P2P group, then such switching-based opportunistic routing path may also feature in the topology map. The routing table can be designed based on the estimated timing of the connection and disconnection of all delivery nodes who are assigned to switch to a particular P2P group. Thus the best route from one P2P group to another P2P group can be chosen depending on most appropriate routing metric including but not limited to estimated end-to-end delay of data packet delivery which may be calculated from the switching schedules of the P2P groups that belong to that route.

In exemplary embodiment, a connection method may include forming wireless peer-to-peer group integrated with a peer to peer content or file sharing application (for example, DTN application) by facilitating flow of information pertaining to exact connection establishment time from P2P communication protocol stack (for example, Wi-Fi Direct) operating at data link layer (or, a P2P connection management application) to the peer to peer content or file sharing application by a coordination mechanism which may then trigger the generation of a message at upper layer (for example, list of contents available at that node or the contents itself) to be shared with the peer node which will solve the problem of blind generation of the message.

In the exemplary embodiment, a system may form wireless peer-to-peer group integrated with a P2P content or file sharing application (for example, DTN application based on intermittent connection establishment between peer nodes) at upper layer by facilitating flow of information pertaining to exact time of connection establishment from P2P communication protocol stack (for example, Wi-Fi Direct) operating at data link layer (or, a P2P connection management application) to an upper layer by a coordination mechanism. The upper layer may be informed about the formation of P2P communication link at the data link layer so that the upper layer may schedule the generation message (for example, list of contents available at that node or the contents itself) accordingly instead of generating such messages blindly without any knowledge of the existence of actual P2P communication link at the data link layer.

An integrated system consisting of a P2P communication protocol operating at the data link layer and a P2P content sharing application at an upper layer may employ Wi-Fi Direct protocol at the data link layer and DTN application at the upper layer. The DTN application at the upper layer may be enabled to receive Wi-Fi Direct connection establishment information from data link layer to the DTN layer. Thus the DTN layer can schedule its generation of message (for example, list of contents available at that node or the contents itself) according to the timing of connection establishment. The mechanism is an approach to alleviate the delay that happens when the DTN layer generates the message independently of the P2P connection establishment at data link layer.

The exemplary embodiment provides a method for route computation based on the group formation schedule information passed from the P2P communication protocol (for example, Wi-Fi Direct) stack operating at data link layer to an upper layer which is responsible for packet routing.

A method according to the exemplary embodiment is also a method in which an upper layer generates a message (for example, list of contents available at that node or the contents itself) on receiving P2P connection establishment information from data link layer or an application managing P2P connection.

According to the exemplary embodiment, inter-group message dissemination among multiple P2P group can be performed by computing the best route from the group formation information from the P2P communication protocol stack operating at data link layer or an application managing P2P connection. From the group reformation information of several switching nodes switching between two or more P2P groups, a best route can be calculated with optimum value of routing metric. The resulting advantageous effect is a consequence of the coordination between P2P communication protocol stack (or an application managing P2P connection) and a P2P content/file sharing application.

According to the exemplary embodiment, a message generation at upper layer will be triggered by P2P connection establishment in data link layer, thus eliminating any bottleneck occurring due to the absence of coordination between the upper layer and data link layer stack.

2. Exemplary Embodiment

Exemplary embodiments will be described according to Wi-Fi Direct specification as an example. The exemplary embodiment is discussed in its complete details with accompanying figures and finally explained with an exemplary scenario.

Wi-Fi Direct based peer-to-peer communication is constrained to group size. In a large gathering of ad-hoc nodes, one-to-many or many-to-many communication (here "many" refers to a large number; definitely greater than the maximum number of P2P Clients that can be accommodated in a single Wi-Fi Direct group) using Wi-Fi Direct may be possible by employing Group Reformation mechanism so that nodes from one group can switch to other groups and vice-versa. A switching schedule may be prepared by Group Owner of at least one group based on a mechanism in which a switching node may switch to other group(s) at a predefined time and then may rejoin its parent group. After the first instance of reformation, the switching node may share the switching schedule of its parent group with the other group which it connects to. Also, the switching node may bring the switching schedule of that group to its parent group. With repeated instances of reformation, a large number of groups may gather each other's switching schedule. As and when a switching schedule of a new group is collected, an application managing Wi-Fi Direct based connection establishment and data communication of at least one node may pass this information to the upper layer responsible for managing packet routing (for example, Network layer, DTN layer or Application layer).

The corresponding upper layer which is responsible for route computation may prepare a routing table based on an estimate of earliest message-delivery route to a node associated to a different group. The best route may be chosen based on the overall end-to-end delay of all known paths which may be estimated based on the group reformation schedule received from Wi-Fi Direct protocol stack (or an application managing Wi-Fi Direct connection establishment). Thus the upper layer which computes routing path without any information about dynamic change in group topology administered by Wi-Fi Direct stack (or an application managing Wi-Fi Direct connection establishment) can design a more sophisticated routing protocol which can exploit the information from the lower layer resulting in efficient routing decisions.

In another exemplary embodiment in a Wi-Fi Direct-DTN integrated system, there can be information sharing between Wi-Fi Direct stack (or an application managing Wi-Fi Direct connection establishment and data communication) and DTN application. For example, DTN layer may generate a message that may include the list of all contents that is present at the memory of a node or the contents themselves. This message may be exchanged with other peer nodes so that a node can request a specific content from another node that possesses the same using pull mechanism. In another method termed push mechanism, a node that possess a specific content pushes it to nodes that do not have it. The message may be generated periodically with period interval "t" without knowing whether a P2P communication link has been established with a neighboring node to enable communication. Thus if the interval "t" is kept too high, then there can be an unusual delay between establishment of connection and transfer of message which is a serious issue in intermittent networks where connections opportunities are ephemeral. If a small value of the interval "t" is chosen, then there is an unnecessary use of CPU and depletion of battery power even when no P2P communication link is established between two nodes. An efficient solution is to enable information flow between Wi-Fi Direct protocol stack (or an application managing Wi-Fi Direct connection establishment) and DTN application. Thus connection establishment in Wi-Fi Direct can trigger the message generation in DTN layer. The message generation at DTN layer can be prevented when there is no Wi-Fi Direct connection between a pair of nodes. The time delay between connection establishment and message generation or transmission can be avoided. Thus, establishment of Wi-Fi Direct connection and message generation works in coordination with each other.

2.1 System Configuration

FIG. 1 shows an exemplary Wi-Fi Direct group 101 where three clients 102, 104, 105 are associated to Group Owner 103. As illustrated in FIG. 1, four nodes form an exemplary Wi-Fi Direct group 101. In the group 101, the node 103 operates as a Group Owner (GO) and other nodes 102, 104, 105 operate as associated Clients, respectively. Once the group 101 is formed, the GO node 103 plays a role analogous to that of an access point in a Wi-Fi infrastructure mode operation.

Figure 2:
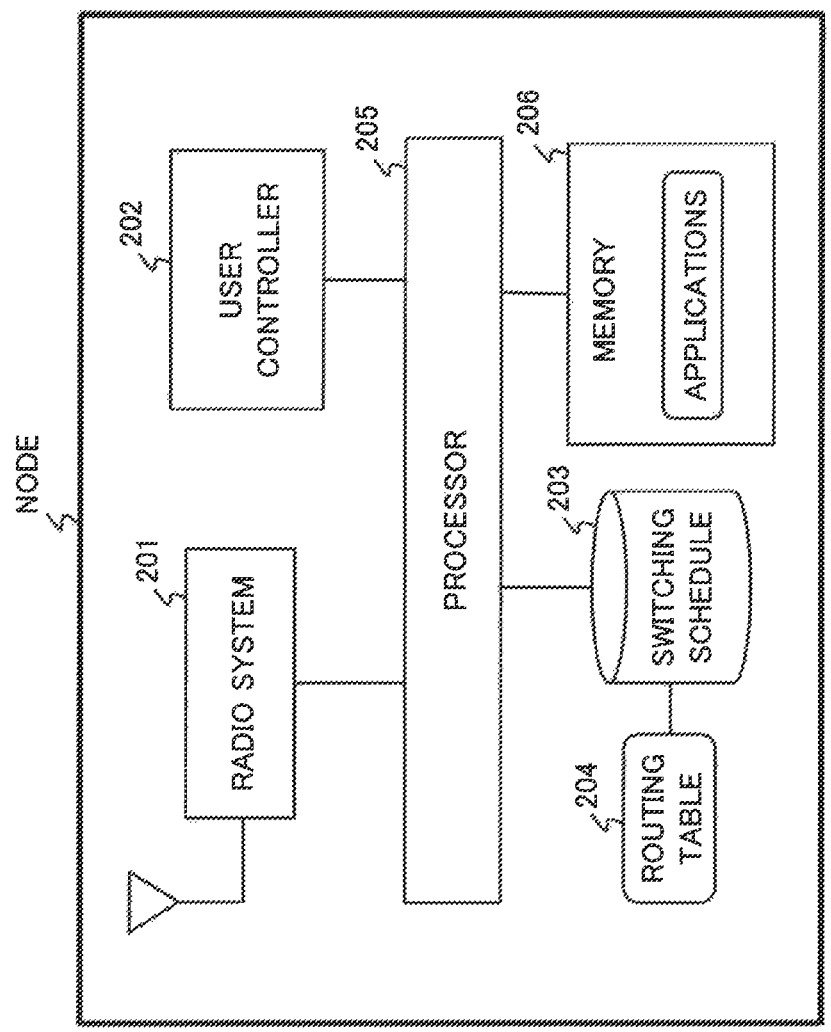
FIG. 2 is a block diagram showing the functional configuration of a node according to an exemplary embodiment.

Referring to FIG. 2, the nodes 102-105 have the same configuration but may operate as GO or Client. The node includes the following functionalities: a radio system 201, a user controller 202, a switching schedule 203, a routing table 204, a processor 205, and a memory 206. The radio system 201 includes a Wi-Fi Direct communication function. The user controller 202 controls Wi-Fi Direct connection procedures such as Device Discovery, GO Negotiation, Provisional Service Discovery and Invitation Mechanism etc. The Switching Schedule 203 may include at least a list of switching nodes (switching devices), the neighboring groups to which they are assigned to switch, the time of departure from current group, the time of return to the current group. The routing table may include the information of a route (for example, the best instantaneous route) to a given destination node. The processor 205 can execute the operating system and applications stored in the memory 206 according to the present embodiment. The switching schedule 203 and routing table 204 may be included in the memory 206 or a separate storage device such as a semiconductor memory. The Wi-Fi Direct communication function may be included in the processor 205 or other part in the node. The radio system 201 may include a transmitter which transmits data (packet) to the other node and a receiver which receives data (packet) from the other node. The radio system 201 may be called a communication module or a transceiver.

FIG. 3 shows an example of an exemplary switching schedule 203 of a predetermined Wi-Fi Direct Group. The switching schedule 203 may include information of the Group ID (ID of the group whose GO generated it), switching node ID, corresponding destination group to which the node will switch, departure time from parent group and return time to parent group. For example, the switching node ID1 switches to the destination group ID1. The switching node departs at the departure time T1 and returns at the arrival time T3.

Figure 4:
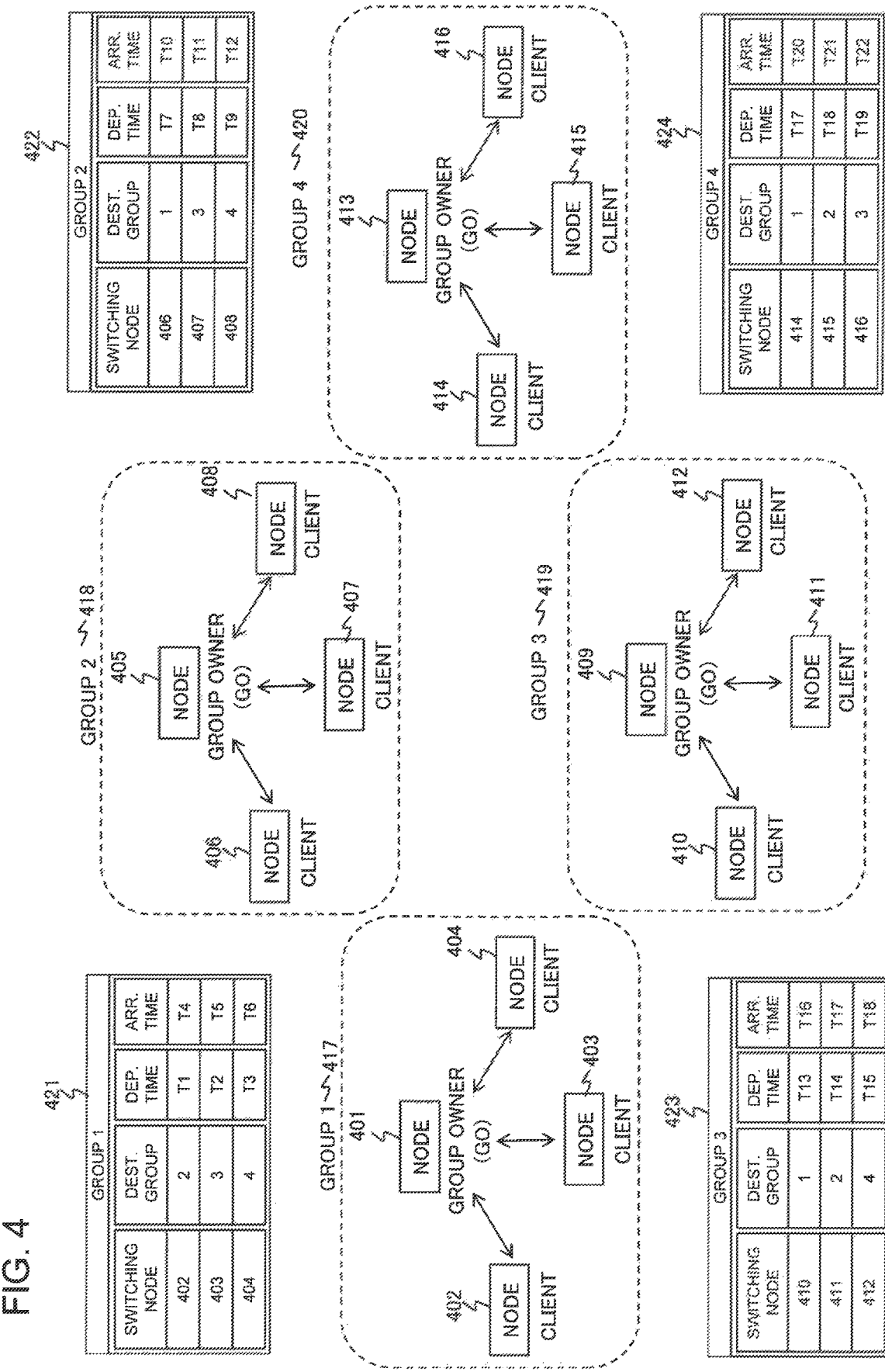
FIG. 4 is a schematic diagram showing four Wi-Fi P2P group and their switching schedules according to an exemplary embodiment.

FIG. 4 shows four exemplary Wi-Fi Direct groups 417-420 operating in neighborhood according to an exemplary embodiment. The Group 1 includes one Group Owner 401 and three clients 402-404 associated to Group Owner 401. The Group 2 includes one Group Owner 405 and three clients 406-408 associated to Group Owner 405. The Group 3 includes one Group Owner 409 and three clients 410-412 associated to Group Owner 409. The Group 4 includes one Group Owner 413 and three clients 414-416 associated to Group Owner 413. Nodes in every group may perform periodic device discovery so as to discover any GO operating in neighborhood. The device discovery results may be shared within the group. For example, both node 403 and 404 can discover the neighboring GO 409 and 413. The GO 401 prepares a switching schedule for its group specifying the departure time and rejoining time for the switching nodes. Alternatively, in another exemplary embodiment, multiple switching nodes may be assigned to switch to the same neighboring group. At their specified departure time, the designated switching nodes 403 and 404 disconnect from the parent group and connect to the assigned neighboring GO 409 and 413, respectively. For ease of explanation, assuming that every group 1 to 4 already knows each other's switching schedule, all nodes (irrespective of GO or Client) are aware of the single/multiple routes to all known reachable nodes. FIG. 4 also shows the exemplary switching schedules 421-424 of Groups 1 to 4. The switching schedules may be created by the application managing the operation of Wi-Fi Direct protocol stack of GO of every group. On receiving the schedules of neighboring groups, the application managing the operation of Wi-Fi Direct protocol stack of GO may send this information to an upper layer (Network Layer or DTN layer or Application layer, as the case may be) which is responsible for routing. Now assume that node 401 has a packet to send to node 416.

The packet can be routed in any of the following 5 routes:

In this table, current time is "Mu" (Greek alphabet) and switching delay is "s". By the "switching delay", the total time consumed since disconnecting from a first Wi-Fi P2P group till establishing connection with a second Wi-Fi P2P group is referred. A similar parameter may be used by adding the time needed for data transmission after connection establishment with switching delay. The exemplary embodiment shows using the switching delay. However, an exemplary embodiment using similar parameters may also be construed to be within the scope of this application. The expression "min(x,y)" implies minimum of the two values x and y.

| Route | Mean end-to-end waiting delay |
|---|---|
| Group1 →Group4 | min(T3-μ + s, T20-μ) |
| Group1 →Group2 → Group4 | min(T1-μ + s, T10-μ) + min(T9-μ + s, T21-μ) |
| Group1 →Group3 → Group4 | min(T2-μ + s, T16-μ) + min(T15-μ + s, T22-μ) |
| Group1 →Group2 → Group3 →Group4 | min(T1-μ + s, T10-μ) + min(T8-μ + s, T17-μ) + min(T15-μ + s, T22-μ) |
| Group1 →Group3 → Group2 →Group4 | min(T2-μ + s, T16-μ) + min(T14-μ + s, T11-μ) + min(T9-μ + s, T21-μ) |

For example, in case of the route from Group 1 to Group 4 directly, the switching node 404 which has a packet will depart at the departure time T3 and arrive in Group 4 after "T3-Mu+s" time units from the current time. Thus, the packet arrives in Group 4 after "T3-Mu+s" time units from current time. In other example, the switching node 414 joins the Group 1, receives the packet from the node 401 and then arrives in Group 4 at T20. Thus, the packet may arrive in Group 4 after "T20-Mu" time units from current time. In an implementation of the exemplary embodiment where minimum end-to-end delay is considered as the routing metric, the route with the minimum end-to-end delay may be chosen by the upper layer for sending the packet from node 401 to node 416. However, there can be other implementations of the exemplary embodiment where other routing metrics can be chosen (including but not limited to hop count, best end-to-end link throughput sum etc). Also, in another exemplary embodiment, the number of times a switching node switches between a pair of wireless P2P networks in per unit interval of time along the route from source to destination may also be used for route computation. Thus, a route with higher switching rate per unit time may be preferred over a route with lower switching rate per unit time.

Figure 5:
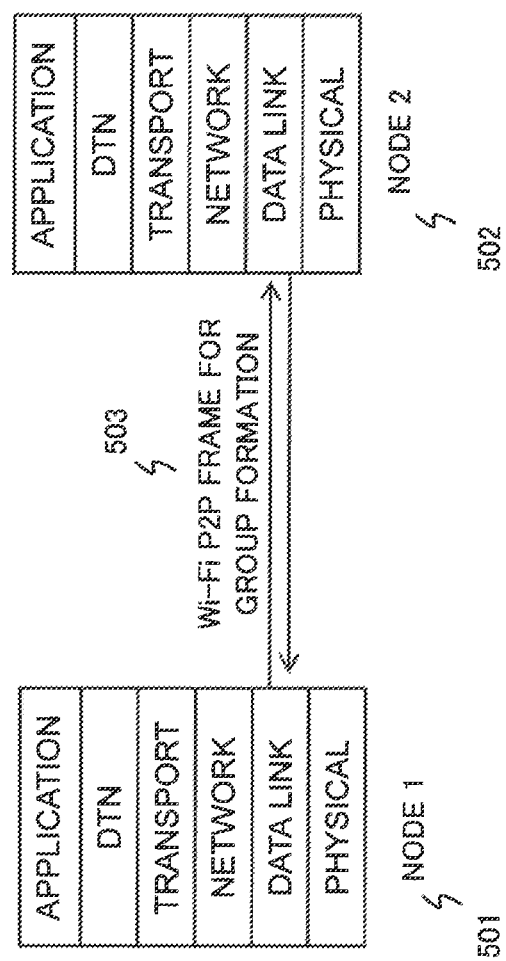
FIG. 5 is a schematic diagram showing two exemplary nodes with layered architecture of protocol stacks wherein the Wi-Fi P2P group formation process is started and being executed at data link layer by exchange of frames for the group formation, according to the exemplary embodiment.

FIG. 5 shows the internal layered architecture of protocol stack running at two exemplary nodes 501 and 502 which uses Wi-Fi Direct at data link layer and DTN application at an upper layer according to an exemplary embodiment. The Wi-Fi P2P protocol stack running at the two nodes exchange necessary frames for group formation information 503 needed to establish Wi-Fi P2P connection and form a Wi-Fi P2P group.

Figure 6:
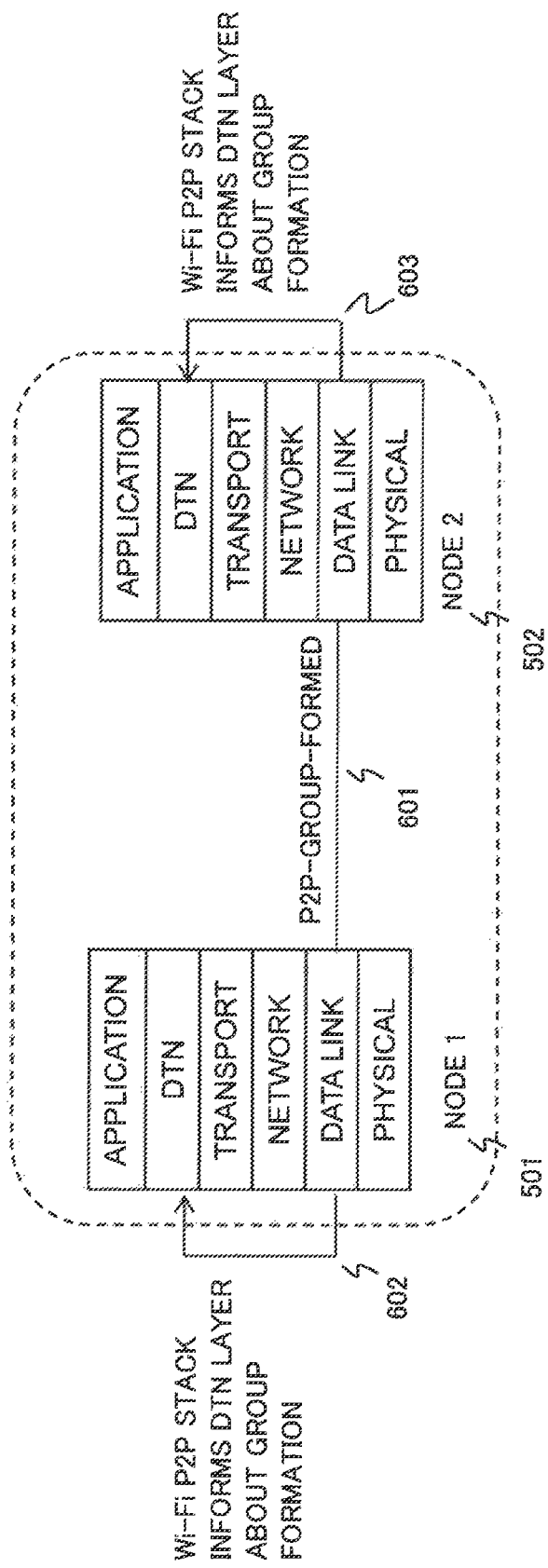
FIG. 6 is a schematic diagram which shows that two nodes have successfully completed group formation process, following which Wi-Fi P2P stack informs Delay Tolerant Network (DTN) layer about the group formation according to the exemplary embodiment.

FIG. 6 shows that after exchanging the necessary frames required for group formation, the nodes 501 and 502 establish a Wi-Fi P2P connection 601 by forming a Wi-Fi P2P group, with one of the nodes assuming the role of GO and the other as client according to an exemplary embodiment. As soon as the group is formed, the information about group formation (group formation information) is passed to the DTN layer as shown by 602 and 603. Such information may include but not limited to at least one switching schedule, P2P link establishment information etc.

Figure 7:
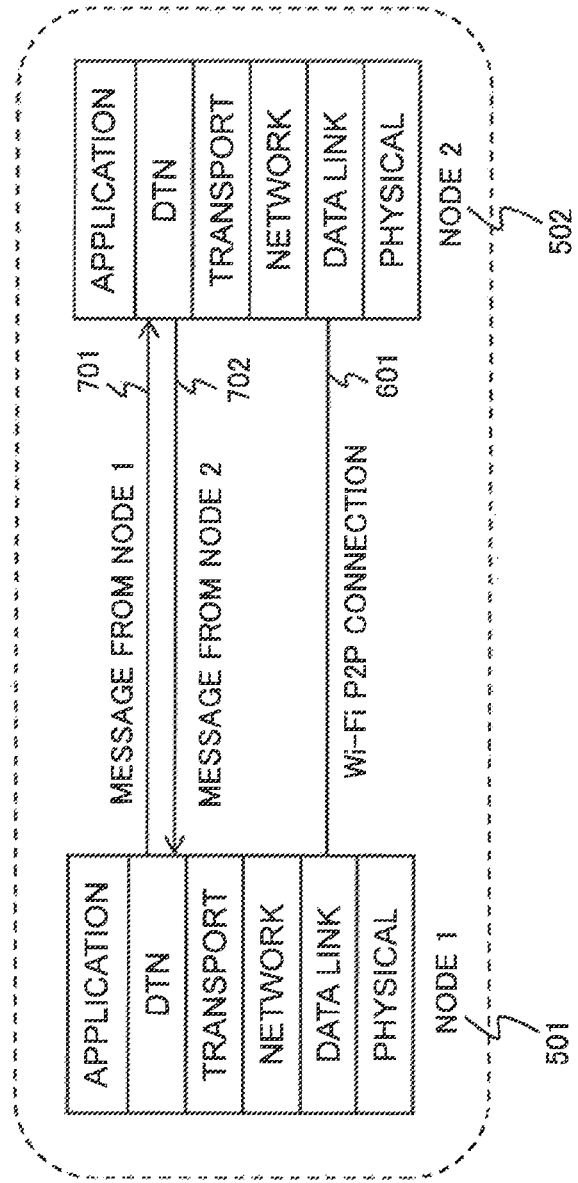
FIG. 7 is a schematic diagram showing DTN layer of Node 1 and 2 generating or sending message after receiving group formation information from Wi-Fi P2P stack according to the exemplary embodiment.

FIG. 7 shows that after receiving Wi-Fi P2P group formation information from Wi-Fi Direct protocol stack or the application managing Wi-Fi Direct connection establishment, the DTN layer at each node starts generating or sending the message 701 and 702 according to an exemplary embodiment. Thus the cardinal coordination between Wi-Fi P2P and DTN layer is achieved.

Figure 8:
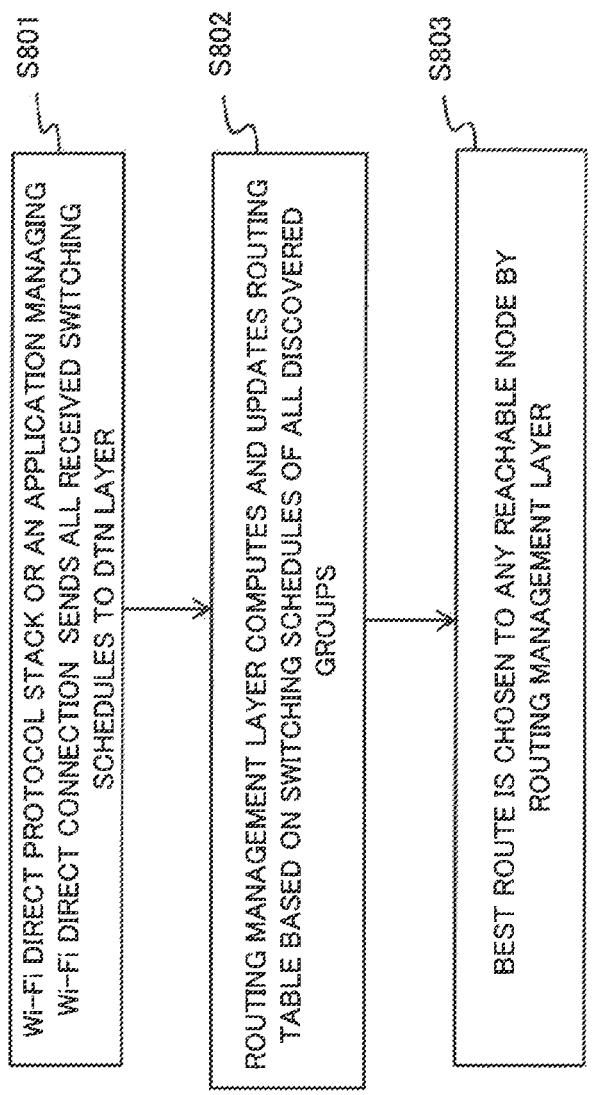
FIG. 8 is a flowchart showing the sequence of events in the construction of routing table by DTN layer using the information from Wi-Fi Direct protocol stack or application managing Wi-Fi Direct connection.

FIG. 8 is a flowchart representing the sequence of events in the exemplary embodiment. In S801, the Wi-Fi Direct protocol layer sends all the received switching schedules of its native as well as neighboring group to the upper layer (for example, DTN layer). In S802, the DTN layer computes the routing table for all reachable groups using the switching schedule. In S803, the best route is chosen based on the metric of interest. In an exemplary embodiment, the metric can be the end-to-end path delay. In such case, the DTN layer may choose the route that consumes the minimum time in transferring the message from the source group (or node) to the destination group (or node).

Figure 9:
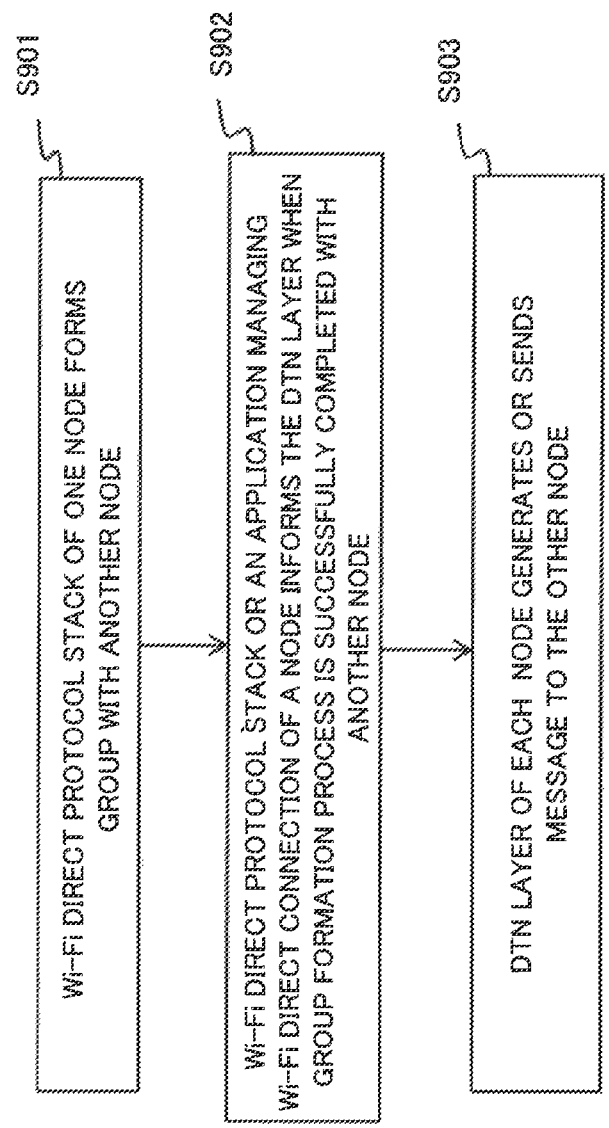
FIG. 9 is a flowchart showing the sequence of events in message generation in DTN layer using Wi-Fi P2P group formation information from data link layer.

FIG. 9 is a flowchart representing the sequence of events wherein the Wi-Fi Direct protocol stack of one node firstly enters the group formation procedure with another node of interest according to an exemplary embodiment. In S901, the Wi-Fi Direct protocol stack of one node forms a group with the other node. In S902, on successful completion of the group formation process, the Wi-Fi Direct protocol stack (or the application managing Wi-Fi Direct connection establishment) of the node informs the DTN layer about the Wi-Fi P2P Group-formation information to generate and send message. In S903, The event of message generation at the DTN layer of either nodes is triggered by the successful connection establishment at Wi-Fi Direct layer (data link layer).

Figure 10:
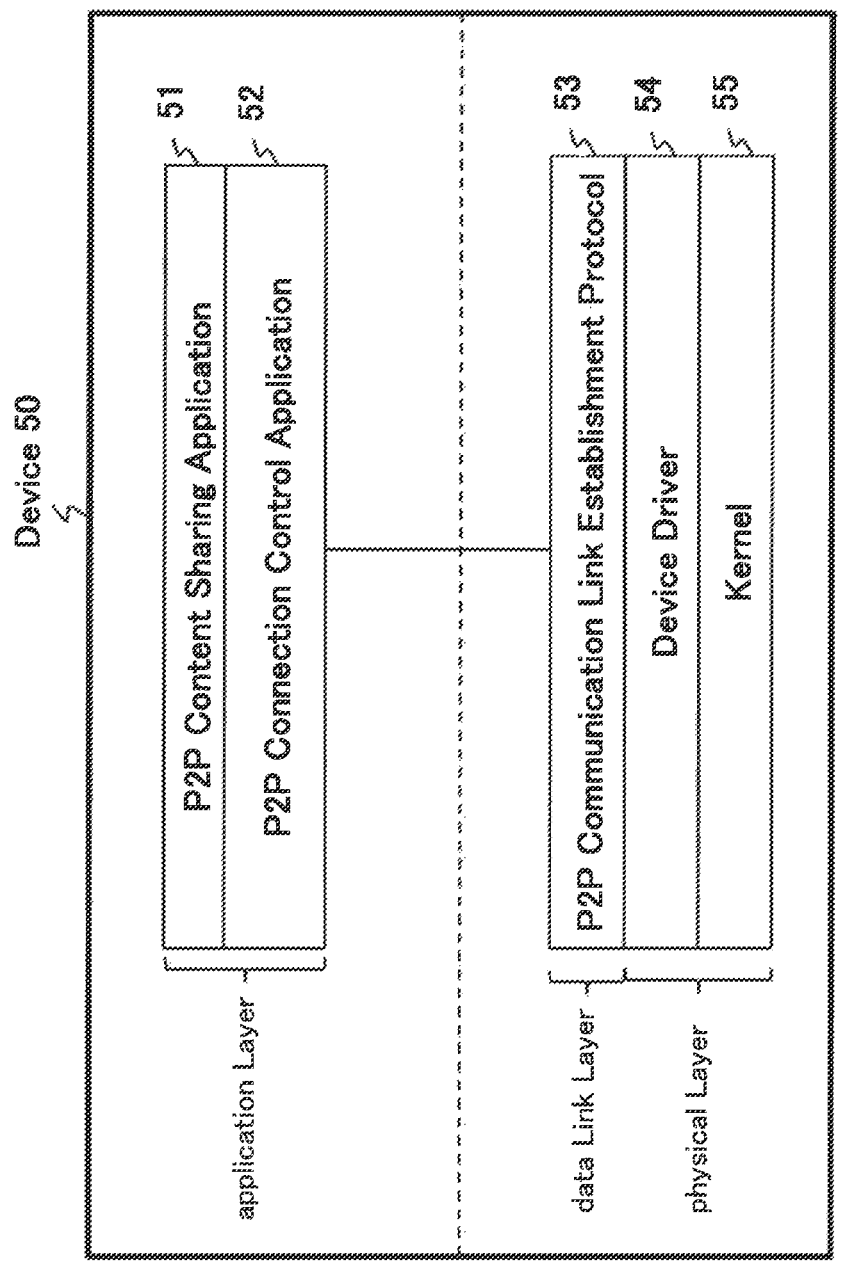
FIG. 10 is a schematic diagram showing an example of a device which performs communication according to one or more embodiments.

FIG. 10 is a schematic diagram showing an example of a device which performs communication according to one or more embodiments. In FIG. 10, a device 50 includes at least an application layer, data link layer and physical layer. The application layer has a P2P Content Sharing Application 51 and a wireless P2P Connection Control Application 52. The data link layer has a P2P Communication Link Establishment Protocol 53. The physical layer has a Device Driver 54 and Kernel 55. Wi-Fi Direct operates in the P2P Communication Link Establishment Protocol 53. An application to control the working of Wi-Fi Direct runs in the P2P Connection Control Application 52. This application collects the group formation information (for example, group formation timing) from data link layer and then passes it to the P2P Content Sharing Application (for example DTN). This application also collects and/or prepares switching schedule and passes it to the P2P Content Sharing Application (for example DTN). The P2P Content Sharing Application 51 is the application for generating message and sharing with peer. The P2P Content Sharing Application 51 may also decide route.

Figure 11:
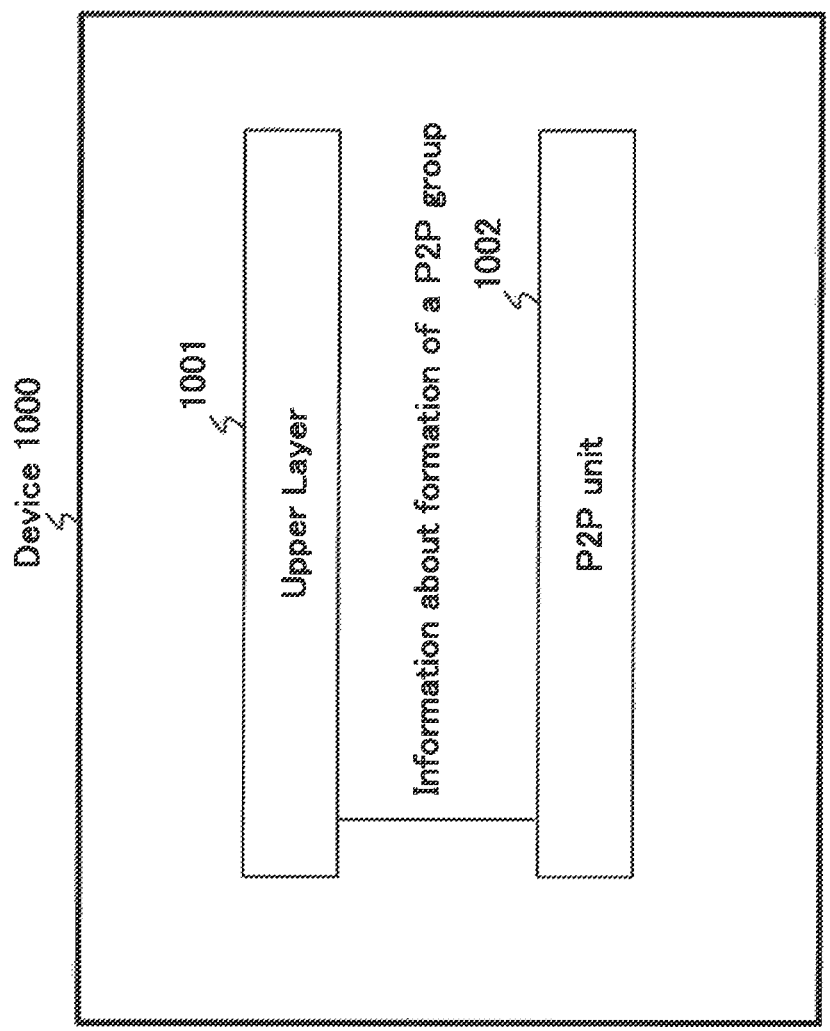
FIG. 11 is a schematic diagram showing a device which performs communication according to one or more embodiments.

FIG. 11 shows a schematic block diagram of a device which performs communication according to one or more embodiments of the present disclosure. In various implementations, the devices may comprise personal computing devices (e.g., smart phones, computing tablets, personal computers, laptops, Personal Digital Assistants (PDAs), etc.) capable of communicating using Peer to Peer communication. In FIG. 11, a device 1000 includes an upper layer 1001 that performs routing at least one packet. The device 1000 also includes a P2P unit 1002 that provides information about formation of a P2P group to the upper layer 1001 which is higher than a data link layer.

The device 1000 may include a memory 206 shown in FIG. 2. The memory may include a system memory component (e.g., Random-Access Memory (RAM)), a static storage component (e.g., Read-Only Memory (ROM)), and/or a disk drive. The device 1000 performs specific operations by the upper layer 1001 and the P2P unit and other components by executing one or more sequences of instructions contained in the system memory component. Logic may be encoded in a computer readable medium, which may refer to any medium that participates in providing instructions to the upper layer 1001 and the P2P unit for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component, and transmission media include coaxial cables, copper wire, and fiber optics, including wires that comprise bus. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, Compact Disc (CD) ROM, any other optical medium, punch cards, paper tape, any other physical medium with patterns of holes, RAM, Programmable ROM (PROM), Electrically Erasable Programmable ROM (EEPROM), FLASH-EEPROM, any other memory chip or cartridge, or any other medium from which a computer is adapted to read.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, the word "device" or "node" may define Group Owner, Client, or P2P device connectable to a group but not connected to any group according to the terminology used in NPL1. However, the use of the word "device" or "node" may also refer to a device capable of wireless communication with another device in a peer-to-peer manner using a technology including but not limited to Wi-Fi Direct, Bluetooth, Wi-Fi IBSS (Independent Basic Service Set) etc. Also, the word "wireless P2P network" may imply a wireless network between two or more devices which can be of any topology.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

The above exemplary embodiments can be applied to wireless peer-to-peer (P2P) networks.

REFERENCE SIGNS LIST 102-105 Node
201 Radio system
202 User controller
203 Switching schedule
204 Routing table
205 Processor
206 Memory

The invention claimed is:

1. A device comprising:
a memory storing one or more instructions; and
a processor configured to execute the one or more instructions to:
perform routing at least one packet at an upper layer which is higher than a data link layer;
provide information about formation of a wireless P2P network to the upper layer,
wherein the information about formation of the wireless P2P network includes a schedule that enables a first device to disconnect from a first owner device, which is a group owner of a first wireless P2P network and to connect with a second owner device which is a group owner of a second wireless P2P network which does not include the first owner device and includes a device that is not included in the first wireless P2P network,
wherein the first wireless P2P network including one or more first group devices and the first owner device exist before and after the first device disconnects from the first wireless P2P network and connects with the second wireless P2P network based on the schedule, and
wherein the second wireless P2P network including one or more second group devices and the second owner device exist before and after the first device disconnects from the first wireless P2P network and connects with the second wireless P2P network based on the schedule.

2. The device according to the claim 1, wherein the schedule comprises at least one of:
the time at which the first device disconnects from and connects again to the first wireless P2P network;
an information about the second wireless P2P network to which the first device connects after disconnecting from the first wireless P2P network;
a number of times that the first device switches connection between the first wireless P2P network and the second wireless P2P network per unit time; and
a data transfer rate between the first wireless P2P network and the second wireless P2P network.

3. The device according to claim 1, further comprising:
a routing table that is based on the information about formation of the wireless P2P network, and
wherein a route of the packet is determined by the upper layer on the basis of the routing table.

4. The device according to the claim 3, further comprising:
a transmitter that transmits the packet along the route determined on the basis of the routing table,
wherein the route is determined on the basis of an end to end delay between a destination device and the device.

5. The device according to the claim 1, further comprising:
a routing table that is based on the information about formation of the wireless P2P network; and
a transmitter that transmits the packet along a route determined on the basis of the routing table,
wherein the route of the packet is determined by the upper layer on the basis of the routing table and an end to end delay between a destination device and the device, and
wherein the end to end delay between the destination device and the device is calculated by time consumed in delivering the packet along the route from source to destination according to a switching delay in the route and the schedule.

6. The device according to the claim 1, wherein the information about formation of the wireless P2P network comprises at least a topology map that includes at least the wireless P2P network.

7. The device according to the claim 1, wherein the upper layer comprises a P2P content sharing application, and
wherein the P2P content sharing application generates a message in response to receiving the information about formation of the wireless P2P network.

8. The device according to the claim 7, wherein the P2P content sharing application comprises an application running Delay Tolerant Networking (DTN) protocol.

9. The device according to the claim 1, wherein the information about formation of the wireless P2P network comprises at least an information which indicates that P2P communication link is established or disconnected between the device and at least one other device.

10. The device according to the claim 1, wherein the information about formation of the wireless P2P network is shared among neighboring wireless P2P networks.

11. The device according to the claim 1, wherein the processor comprises a P2P wireless communication protocol running at the data link layer or an application running at an application layer that manages P2P wireless connection.

12. The device according to the claim 1, wherein the device supports Wi-Fi Direct.

13. The device according to the claim 1, wherein,
in case that the device is the first device in the first wireless P2P network, the processor is further configured to send the information in the device to the second owner device when the device, in accordance with the schedule, disconnects from the first wireless P2P network and connects to the second owner device in the second wireless P2P network.

14. The device according to the claim 1, wherein,
in case that the device is the first owner device in the first wireless P2P network, the processor is further configured to obtain the information from the first device when the first device, in accordance with the schedule, disconnects from the second owner device in the second wireless P2P network and connects to the device.

15. The device of claim 1, wherein the information is provided from a layer below a network layer to a layer above the network layer.

16. A system comprising:
a device; and
a destination device;
wherein the device comprises:
a memory storing one or more instructions; and
a processor configured to execute the one or more instructions to:
perform routing at least one packet at an upper layer which is higher than a data link layer; and provide information about formation of a wireless P2P network to the upper layer, and wherein the destination device includes:

a receiver which receives the packet along a route decided by the upper layer of the device, wherein the information about formation of the wireless P2P network includes a schedule that enables a first device to disconnect from a first owner device, which is a group owner of a first wireless P2P network and to connect with a second owner device, which is a group owner of a second wireless P2P network which does not include the first owner device and includes a device that is not included in the first wireless P2P network, wherein the first wireless P2P network including one or more first group devices and the first owner device exist before and after the first device disconnects from the first wireless P2P network and connects with the second wireless P2P network based on the schedule, and wherein the second wireless P2P network including one or more second group devices and the second owner device exist before and after the first device disconnects from the first wireless P2P network and connects with the second wireless P2P network based on the schedule.

17. The system of claim 16, wherein the information is provided from a layer below a network layer to a layer above the network layer.

18. A control method for a device comprising:

performing, at an upper layer that is higher than a data link layer, routing at least one packet; and providing information about formation of a wireless P2P network to the upper layer, wherein the information about formation of the wireless P2P network includes a schedule that enables a first device to disconnect from a first owner device, which is a group owner of a first wireless P2P network and to connect with a second owner device, which is a group owner of a second wireless P2P network which does not include the first owner device and includes a device that is not included in the first wireless P2P network, wherein the first wireless P2P network including one or more first group devices and the first owner device exist before and after the first device disconnects from the first wireless P2P network and connects with the second wireless P2P network based on the schedule, and wherein the second wireless P2P network including one or more second group devices and the second owner device exist before and after the first device disconnects from the first wireless P2P network and connects with the second wireless P2P network based on the schedule.

19. The method of claim 18, wherein the information is provided from a layer below a network layer to a layer above the network layer.

* * * * *